US009405076B2

(12) United States Patent
Chen et al.

(10) Patent No.: US 9,405,076 B2
(45) Date of Patent: Aug. 2, 2016

(54) MULTI-FIBER FERRULE WITH A LENS PLATE

(75) Inventors: Wenzong Chen, Naperville, IL (US); Dean Richardson, Wilmette, IL (US); Malcolm H. Hodge, Chicago, IL (US); Thomas J. Coughlin, Naperville, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/234,342

(22) PCT Filed: Jul. 27, 2012

(86) PCT No.: PCT/US2012/048555
§ 371 (c)(1),
(2), (4) Date: Apr. 25, 2014

(87) PCT Pub. No.: WO2013/019622
PCT Pub. Date: Feb. 7, 2013

(65) Prior Publication Data
US 2014/0321814 A1 Oct. 30, 2014

Related U.S. Application Data

(60) Provisional application No. 61/513,197, filed on Jul. 29, 2011.

(51) Int. Cl.
*G02B 6/38* (2006.01)
*G02B 6/32* (2006.01)
(52) U.S. Cl.
CPC ............ *G02B 6/3825* (2013.01); *G02B 6/3853* (2013.01); *G02B 6/3885* (2013.01); *G02B 6/32* (2013.01)

(58) Field of Classification Search
None
See application file for complete search history.

(56) References Cited

U.S. PATENT DOCUMENTS

| 5,241,612 | A | 8/1993 | Iwama |
| 5,420,954 | A | 5/1995 | Swirhun et al. |
| 5,446,815 | A | 8/1995 | Ota et al. |
| 6,863,453 | B2 | 3/2005 | Wang et al. |
| 7,234,875 | B2 | 6/2007 | Krowiak et al. |
| 7,510,337 | B2 | 3/2009 | Takeda et al. |
| 2002/0097956 | A1 | 7/2002 | Kikuchi et al. |
| 2003/0113077 | A1 | 6/2003 | Xu et al. |
| 2006/0068629 | A1* | 3/2006 | Nakajima ............... 439/378 |
| 2006/0245694 | A1 | 11/2006 | Chen et al. |
| 2009/0154884 | A1 | 6/2009 | Chen et al. |
| 2010/0266245 | A1 | 10/2010 | Sabo |

FOREIGN PATENT DOCUMENTS

| CN | 201373930 Y | 12/2009 |
| CN | 101718893 A | 6/2010 |

(Continued)

OTHER PUBLICATIONS

International Search Report for PCT/US2012/048555.

*Primary Examiner* — Jerry Rahll
(74) *Attorney, Agent, or Firm* — Jeffrey K. Jacobs

(57) ABSTRACT

An optical fiber assembly includes a ferrule body with a plurality of optical fibers and an end of each optical fiber positioned adjacent the front face of the ferrule body. A beam-expanding element is positioned adjacent the front face of the ferrule body including a lens array aligned with the optical fibers. The lens array is spaced from the optical fibers by a predetermined distance to form a gap with an index-matched medium within the gap. A method of manufacturing the optical fiber assembly is also provided.

14 Claims, 11 Drawing Sheets

(56) References Cited

FOREIGN PATENT DOCUMENTS

| JP | 05-297245 | 11/1993 |
| JP | 09-311244 | 12/1997 |
| JP | 2004-102108 | 4/2004 |
| JP | 2004-252244 | 9/2004 |
| JP | 2011-141386 | 7/2011 |
| KR | 2008-0088723 A | 10/2008 |

* cited by examiner

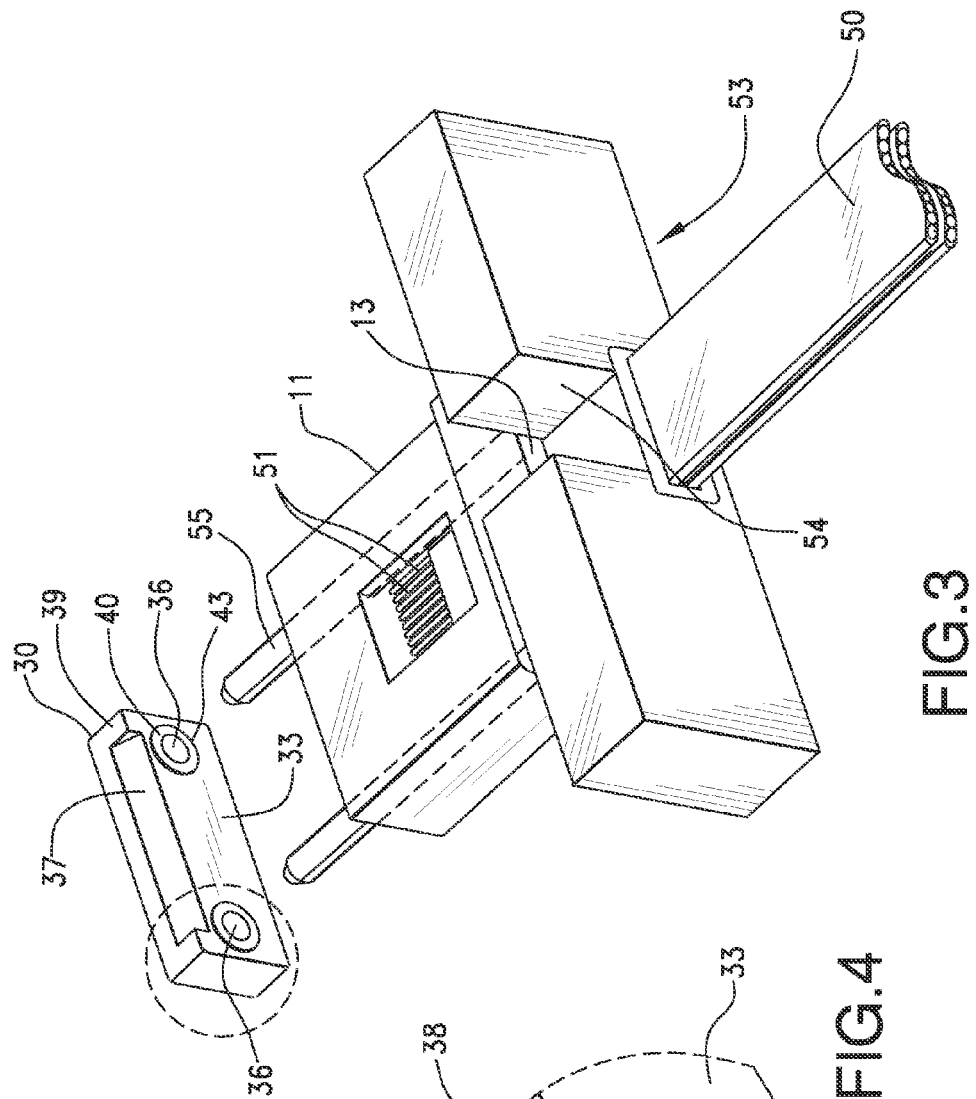
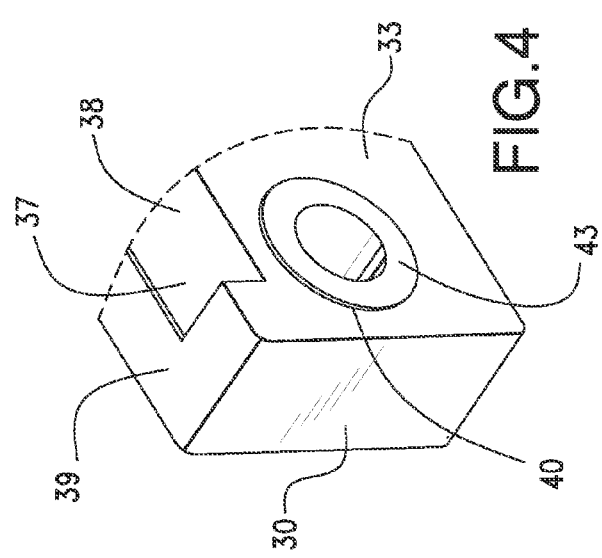

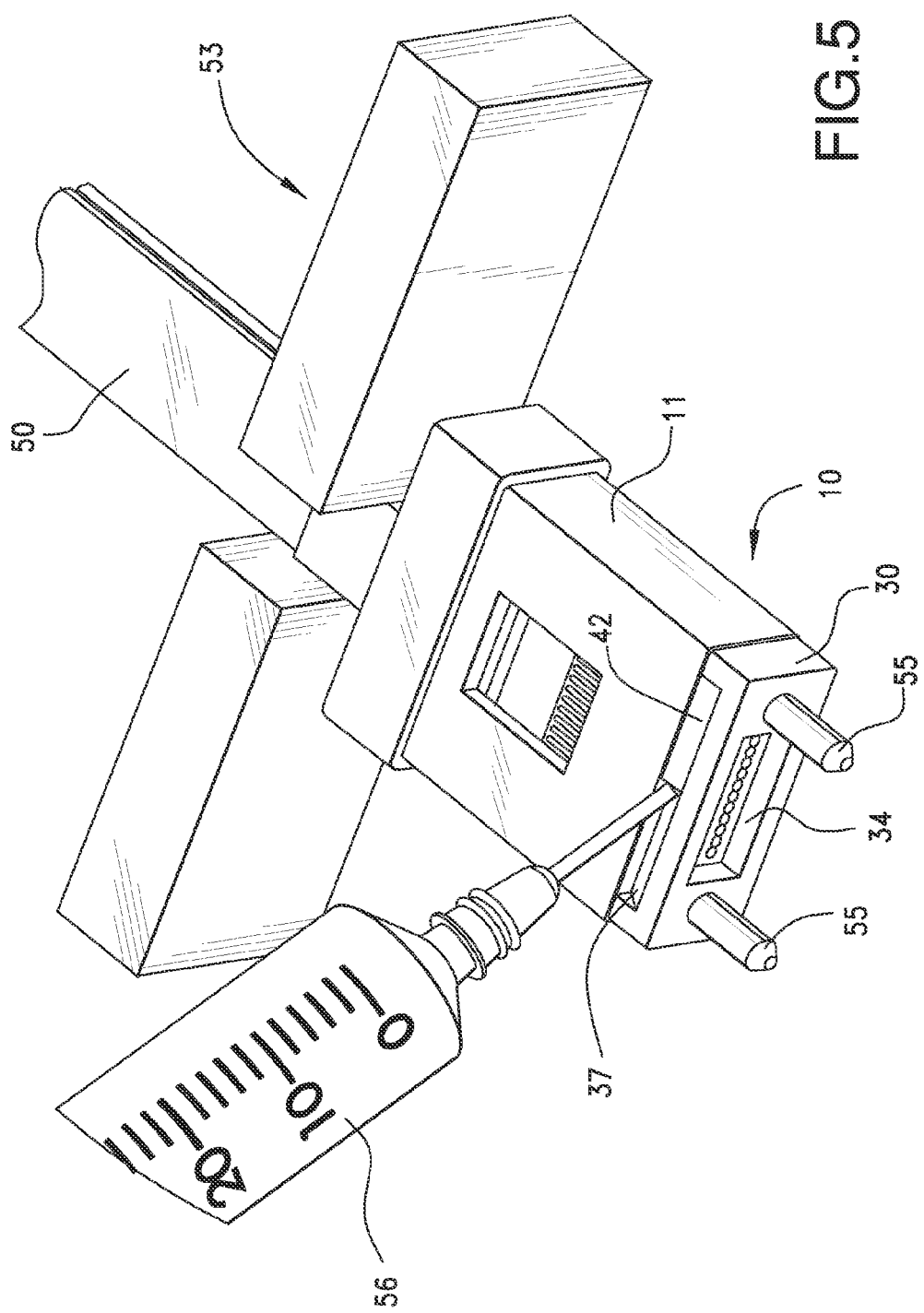

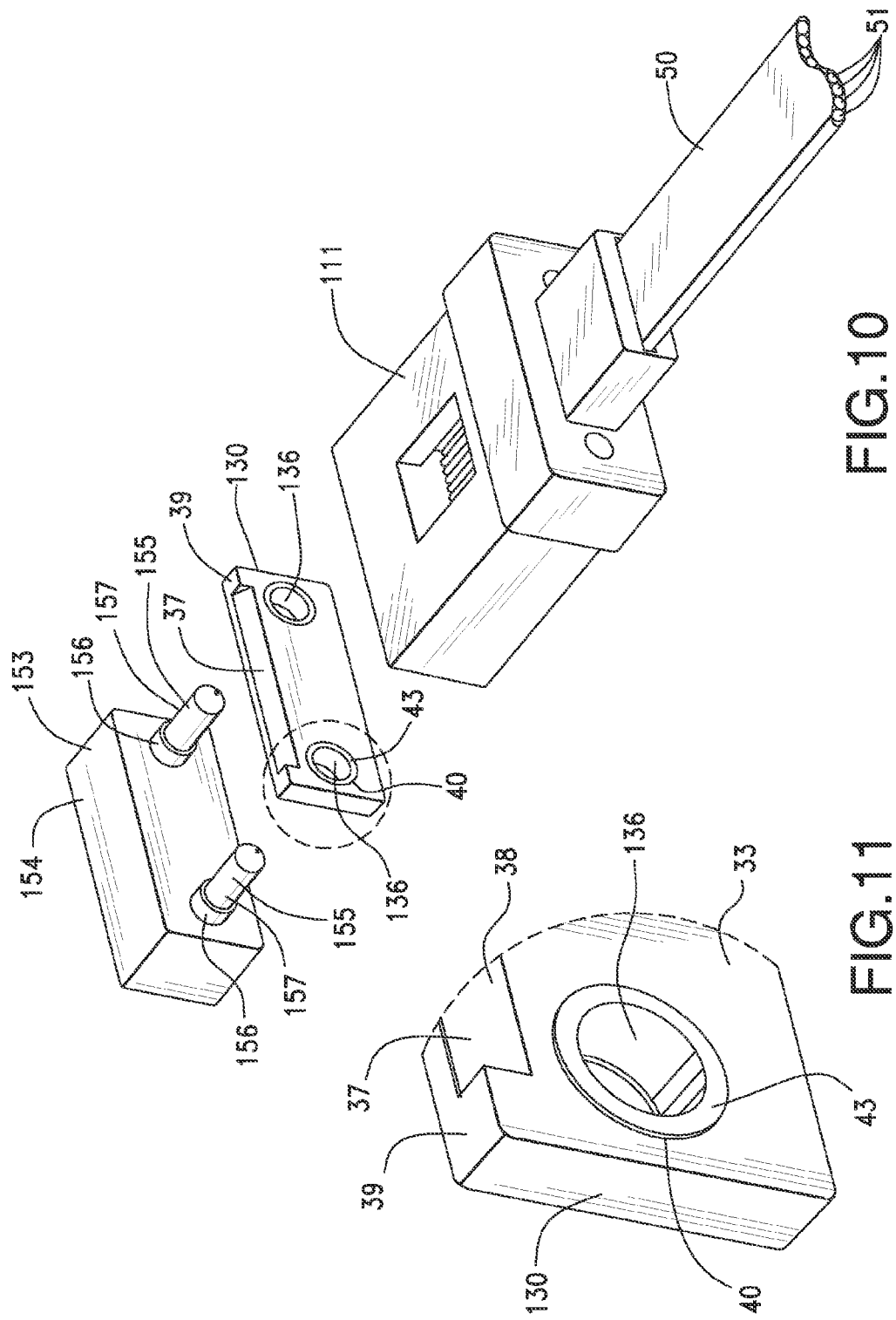

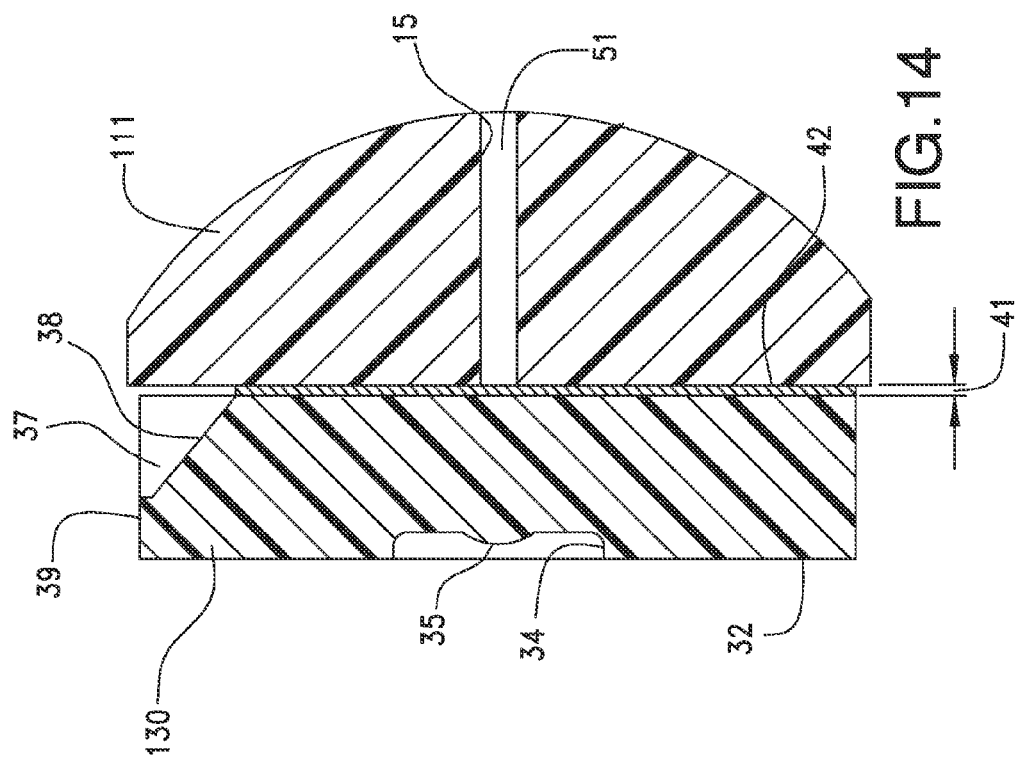
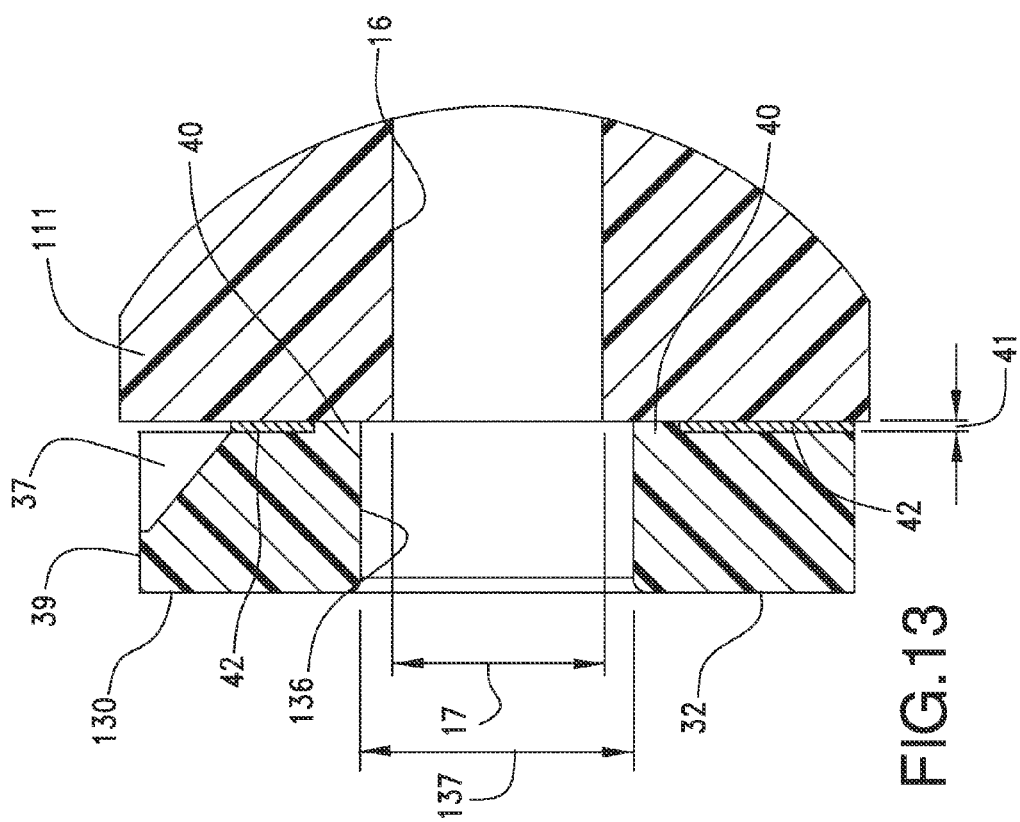

MULTI-FIBER FERRULE WITH A LENS PLATE

REFERENCE TO RELATED APPLICATIONS

The Present application is claims priority to prior-filed U.S. Provisional Patent Application No. 61/513,197, entitled "Multi-Fiber Ferrule With A Lens Plate," filed on 29 Jul. 2011 with the United States Patent And Trademark Office. The content of the aforementioned patent application is fully incorporated in its entirety herein.

BACKGROUND OF THE PRESENT DISCLOSURE

The Present Disclosure relates generally to optical fiber ferrule assemblies, and, more particularly, to a multi-fiber ferrule assembly with an adjacent lens structure.

Systems for interconnecting optical fibers typically utilize mating ferrule assemblies to facilitate handling and accurate positioning of the fibers. The optical fibers are secured within a ferrule body, with an end surface of each fiber being positioned generally flush with or slightly protruding from an end face of the ferrule body. The end surfaces or faces of the fibers are then polished to a desired finish. When complementary ferrules assemblies are mated, each optical fiber of a ferrule assembly is coaxially positioned with a mating optical fiber of the other ferrule assembly.

In some applications, the end faces of the mating optical fibers physically contact one another in order to effect signal transmission between the mating optical fiber pair. In such applications, various factors may reduce the efficiency of the light transmission between the optical fiber pair such as irregularities, burrs or scratches in the fiber end faces, misalignment of the fibers as well as dust or debris between the fibers at the mating interface.

Due to the small optical path relative to the size of any foreign objects such as dust or debris, any such foreign objects will likely interfere with the transmission of light. Expanded beam connectors expand the width of the optical beam and transmit the beam over an air gap between the connectors. By expanding the beam, the relative size difference between the dust or debris and the beam is increased which thus reduces the impact of any dust or debris as well as any misalignment on the efficiency of the light transmission. As a result, expanded beam optical fiber connectors are often used in dirty and high vibration environments.

Expanded beam connectors include a lens mounted adjacent an end face of each fiber. Two types of lenses are commonly used—collimating and cross-focusing. A collimating lens receives the light from the fiber and expands the beam to a relatively large diameter. When using a collimating lens, a second lens and ferrule assembly is similarly configured with the lens positioned adjacent the end face of the second fiber for receiving the expanded beam, and refocuses the beam at the end face of the second fiber. A cross-focusing lens receives the light from the fiber, expands it to a relatively large diameter, and then focuses the light from the relatively large diameter at a specific focal point. With cross-focusing lenses, the lens and ferrule assembly may be mated with either another lens and ferrule assembly having a cross-focusing lens or with a non-lensed ferrule assembly, as is known in the art. While lenses for alignment with a ferrule assembly having a single optical fiber are typically spherical, lenses for alignment with multi-fiber ferrule assemblies are more complex in nature, and tolerances typically must be controlled more tightly. Accordingly, it is desirable to provide a multi-fiber lensed ferrule assembly that is less complex, easy to assemble and has improved performance.

SUMMARY OF THE PRESENT DISCLOSURE

The optical fiber assembly of the Present Disclosure includes a ferrule body with a plurality of optical fibers, an end of each optical fiber positioned adjacent the front face of the ferrule body. A beam-expanding element, positioned adjacent the front face of the ferrule body, includes a lens array aligned with the optical fibers.

The lens array may be spaced from the optical fibers by a predetermined distance to form a gap with an index-matched medium within the gap. If desired, the medium may be an adhesive securing the beam-expanding element to the ferrule body. A reservoir may be provided adjacent the gap to facilitate flow of the medium into the gap. The gap may be between approximately 25-50 microns wide. A spacer may engage the front face of the ferrule body to define the width of the gap. The spacer may be integral with the beam-expanding element. The beam-expanding element may be a generally rectangular lens plate having a plurality of lenses, each lens being aligned with one of the optical fibers. The optical fibers may be arranged in at least one generally linear array, and the reservoir may extend linearly generally parallel to and may be at least as long as the linear array of optical fibers. The reservoir may be tapered to narrow away from an upper surface of the beam-expanding element.

If desired, a spacer may engage the front face of the ferrule body to at least in part define the gap between a rear surface of the lens portion and the front face of the ferrule. The spacer may be integral with the beam-expanding element. The rear surface of the lens portion may be generally planar. The spacer may also be integral with and extend from the rear surface of the lens portion. The ferrule body may include first and second spaced apart alignment holes, and the beam-expanding element may include first and second spaced apart guide holes. The first alignment hole of the ferrule body may be coaxial with the first guide hole of the beam-expanding element, and the second alignment hole of the ferrule body may be coaxial with the second guide hole of the beam-expanding element. First and second spacers may be provided for maintaining a rear face of the beam-expanding element a predetermined distance from the optical fibers. Each first spacer may be coaxial with the first alignment and guide holes, and each second spacer may be coaxial with the second alignment and guide holes. Each spacer may have a length in a direction of mating of the optical fiber assembly of between approximately 25-50 microns.

If desired, the front face of the ferrule body may have a pair of alignment holes configured to receive a post therein. The beam-expanding element may have a pair of guide holes aligned with the alignment holes of the ferrule body. The guide holes may have a larger diameter than the alignment holes.

A method of manufacturing an optical fiber cable assembly may include providing a ferrule body with a plurality of optical fibers positioned in the ferrule body with ends of the optical fibers positioned adjacent the front face of the ferrule. A beam-expanding element may be positioned adjacent the front face with lens portions of the beam-expanding element in alignment with optical fibers of ferrule body. The lens portions of the beam-expanding element may be spaced from the optical fibers by a predetermined distance to form a gap, and an index-matched medium applied to a reservoir adjacent the gap with at least some of the medium moving from the reservoir into the gap.

If desired, the gap may be dimensioned and the medium chosen in part to facilitate movement of the medium into the gap. The medium may be an adhesive such as epoxy and may also include the step of curing the adhesive to secure the beam-expanding element to the ferrule.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 3 is a perspective view similar to FIG. 2, but taken from the rear direction and with the ferrule body assembly positioned on the assembly fixture;

FIG. 4 is an enlarged fragmented perspective view of the encircled portion of FIG. 3;

FIG. 5 is a perspective view similar to FIG. 2, but with the ferrule body assembly and lens plate mounted on the assembly fixture and during the process of applying an adhesive;

FIG. 10 is a perspective view similar to FIG. 9, but taken from the rear direction and with the ferrule body assembly positioned on the assembly fixture;

FIG. 11 is an enlarged fragmented perspective view of the encircled portion of FIG. 10;

FIG. 13 is a fragmented side view of a portion of the ferrule and lens plate assembly, taken generally along Line 13-13 of FIG. 8, depicting the interaction between the ferrule body assembly and the lens plate adjacent alignment holes of the ferrule and lens plate assembly; and FIG. 14 is a fragmented side view of a portion of the ferrule and lens plate assembly, taken generally along Line 14-14 of FIG. 8, depicting the interaction between the ferrule body assembly and the lens plate adjacent the optical fibers within the ferrule and lens plate assembly.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
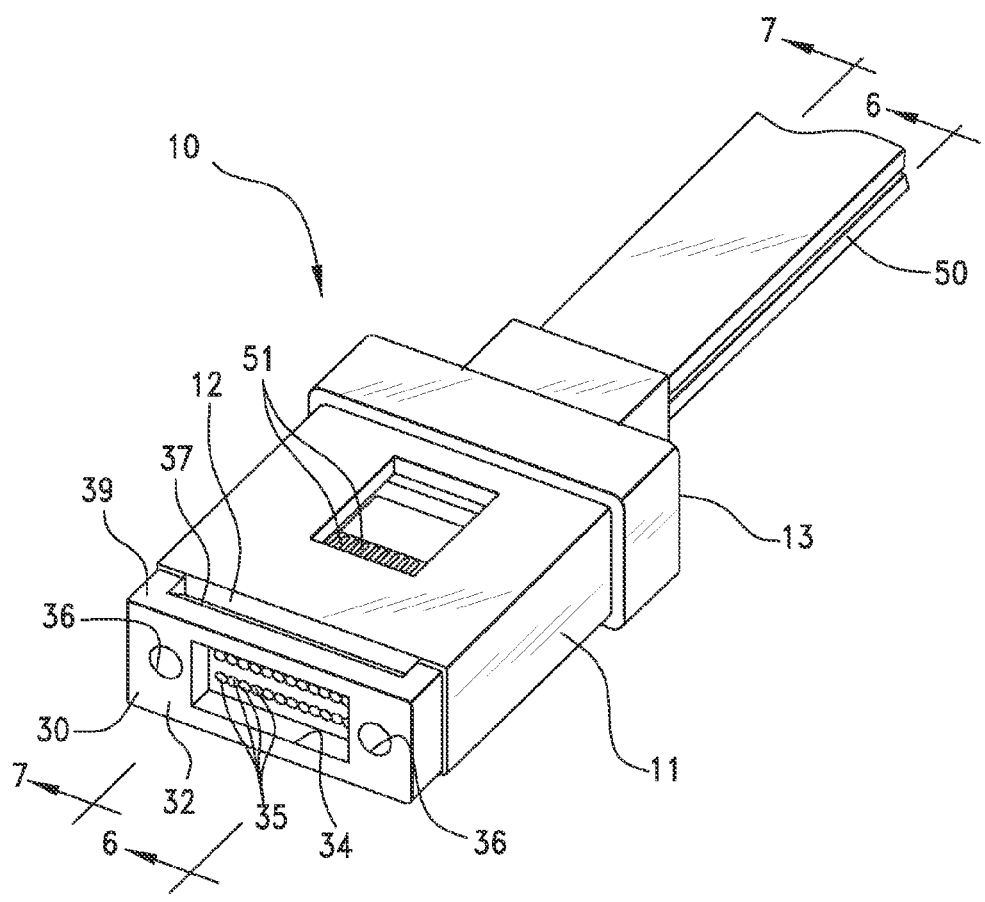
FIG. 1 is a perspective view of an embodiment of a terminated ferrule and lens plate assembly.

Referring to FIG. 1, a multi-fiber MT type lensed ferrule assembly 10 is illustrated. The ferrule assembly 10 includes a ferrule body 11 having a light expanding element such as lens plate 30 and terminated to a multi-fiber cable 50 having a plurality of optical fibers 51. As depicted, ferrule assembly 10 includes two rows of twelve optical fibers 51 although the ferrule assembly could be configured to receive greater or fewer optical fibers if desired.

Figure 2:
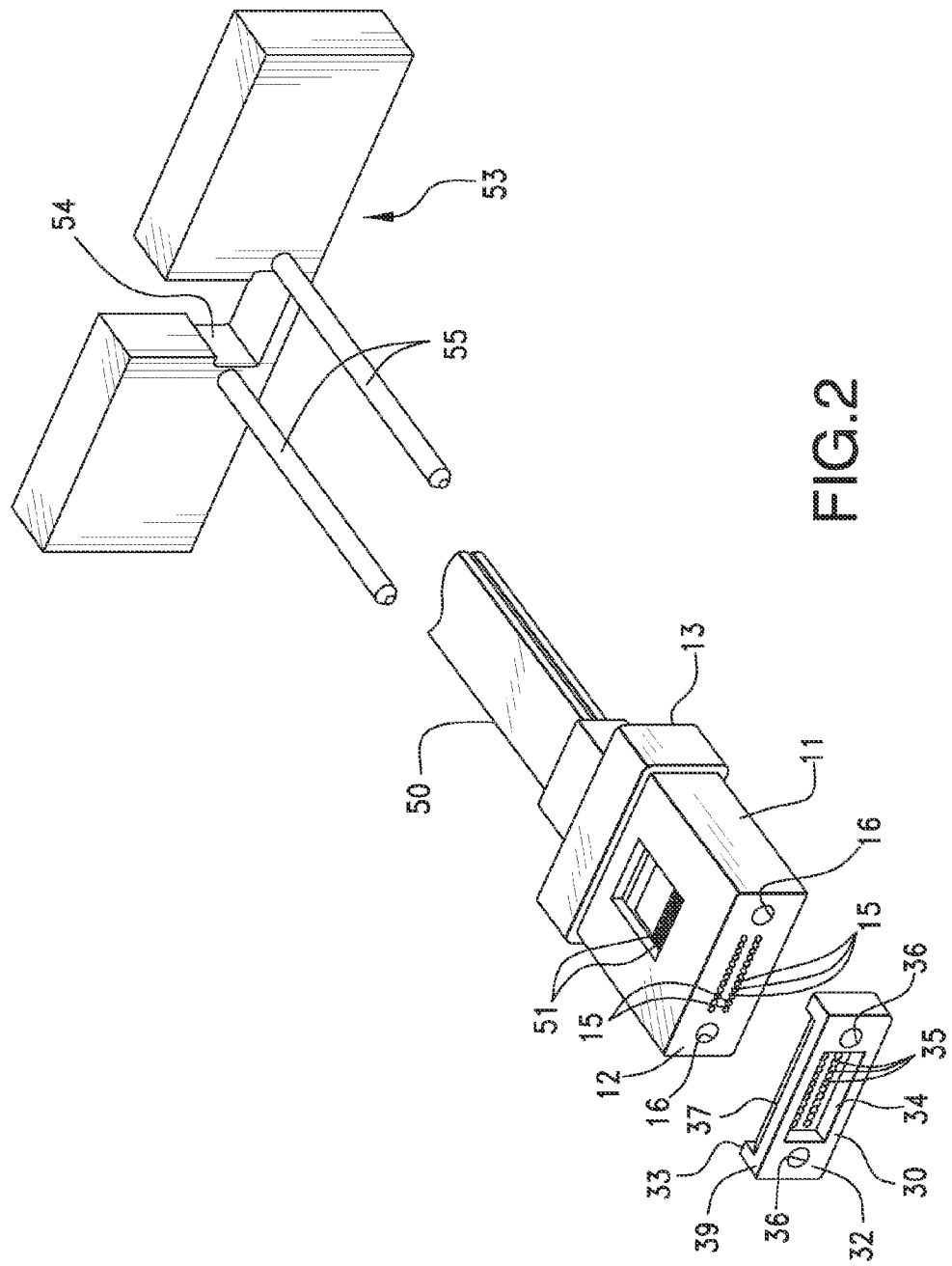
FIG. 2 is a perspective view of a terminated ferrule body and an aligned lens plate of FIG. 1, aligned prior to positioning on the ferrule together with a somewhat schematic view of an assembly fixture.

The ferrule body 11 is generally rectangular and has a generally flat front face 12 and a generally flat rear face 13. As depicted in FIG. 2, ferrule body 11 includes two rows of twelve generally cylindrical optical fiber receiving holes or bores 15 that extend through the ferrule body 11 to the front face 12. In addition, ferrule body 11 also includes a pair of alignment holes or receptacles 16 positioned on opposite sides of the array of fiber receiving holes 15. As depicted, alignment holes 16 are generally cylindrical and extend from front face 12 to rear face 13. However, in some embodiments, the holes 16 may not extend all of the way to rear face 13, may not have a uniform cross-section (such as the cylinder depicted) but rather may be tapered or stepped as disclosed in U.S. Pat. No. 7,527,436, the content of which is incorporated herein in its entirety, or may have a uniform, non-circular cross-section such as a hexagonal cross-section. The alignment holes 16 are configured to receive a post therein to facilitate alignment when mating a pair of connectors. In the depicted MT ferrule body, each alignment hole 16 has a diameter of approximately seven hundred microns. Alignment holes of other diameters could be used if desired.

Ferrule body 11 may be formed of a resin capable of being injection molded, such as polyphenylene sulphide or polyetherimide and may include an additive such as silica ($SiO_2$) to increase the dimensional characteristics, strength and stability of the resin. One of the optical fibers 51 of multi-fiber cable 50 is positioned within each fiber receiving hole 15 and the front face of the ferrule body 11 and the end faces of the optical fibers 51 adjacent the front face 12 are polished to a desired finish.

Lens plate 30 is generally rectangular and has a front face 32 and a generally flat rear face 33. Lens plate 30 may be formed of an optical grade resin that is capable of being injection molded with the refractive index closely matching that of the optical fibers 51. A recess 34 is centrally located in the front face 32 and includes a plurality of lens elements 35.

One lens element 35 is aligned with the end face of each optical fiber 51 located in its respective optical fiber receiving hole 15 in the ferrule body. In an expanded beam connector, two common types of lens elements are collimating or a cross-focusing. In the depicted embodiment, the lens elements 35 are of the cross-focusing type and include a convex shape (FIG. 7) projecting from the bottom 34' of recess 34 towards front face 32 of lens plate 30. Lens plate 30 also includes a pair of cylindrical guide holes or receptacles 36, configured to be aligned with the alignment holes 16 of ferrule body 11. Each guide hole 36 is configured to have a diameter that matches that of alignment hole 16 of ferrule body 11 and thus has a diameter of approximately 700 microns in the depicted embodiment.

Figure 6:
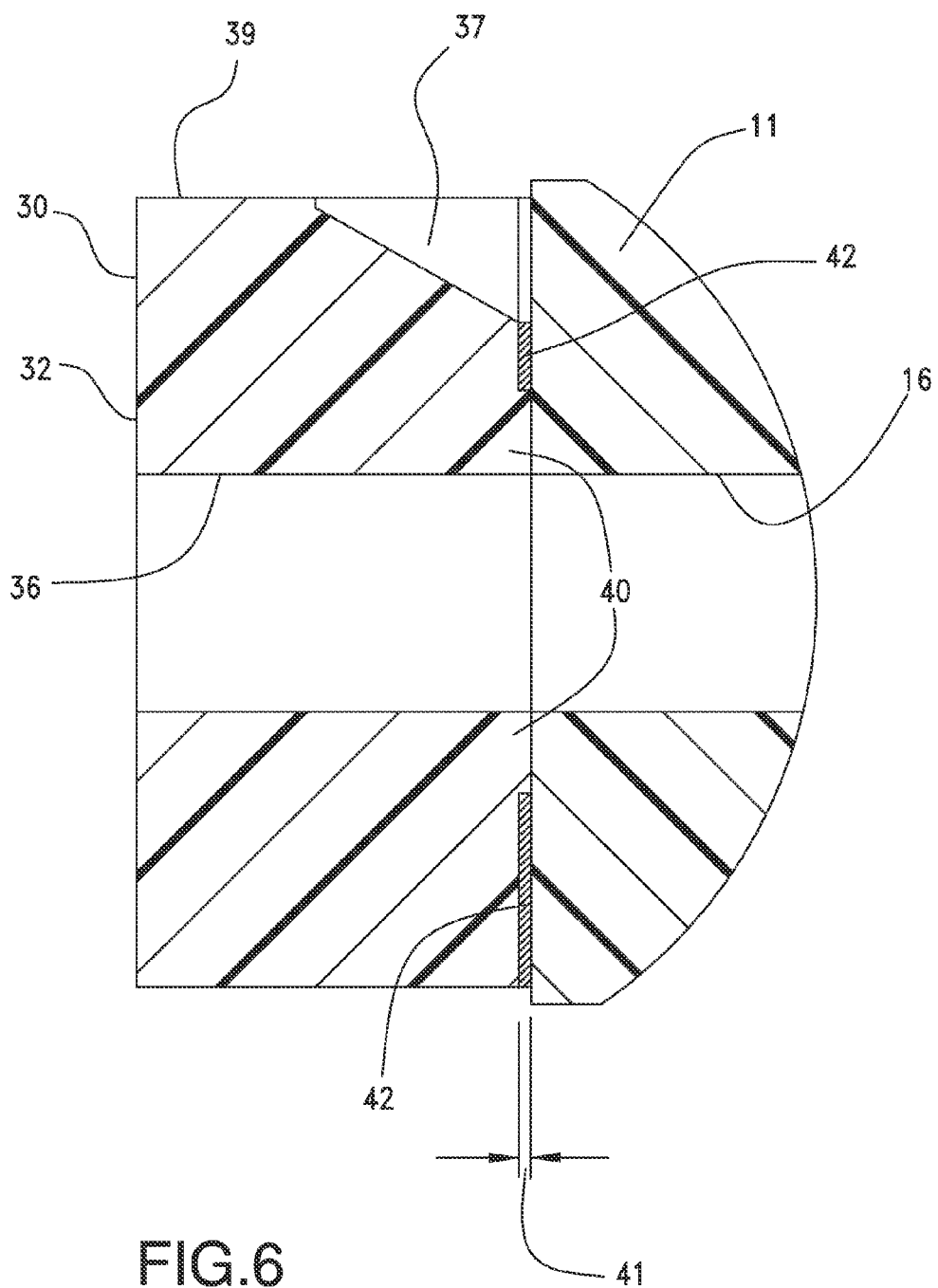
FIG. 6 is a fragmented side view of a portion of the ferrule and lens plate assembly, taken generally along Line 6-6 of FIG. 1, depicting the interaction between the ferrule body assembly and the lens plate adjacent alignment holes of the ferrule and lens plate assembly.
Figure 7:
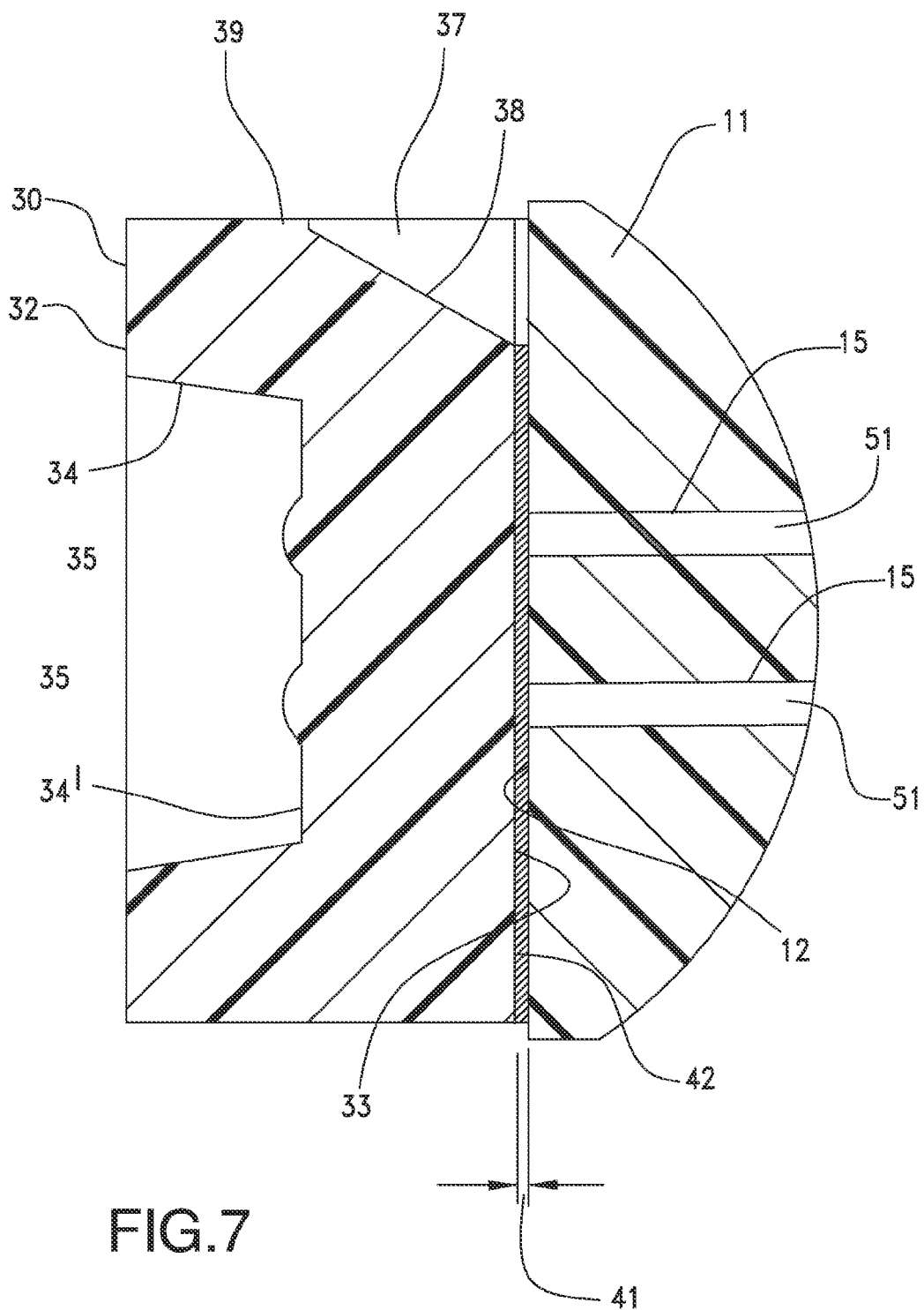
FIG. 7 is a fragmented side view of a portion of the ferrule and lens plate assembly, taken generally along Line 7-7 of FIG. 1, depicting the interaction between the ferrule body assembly and the lens plate adjacent the optical fibers within the ferrule and lens plate assembly.
Figure 8:
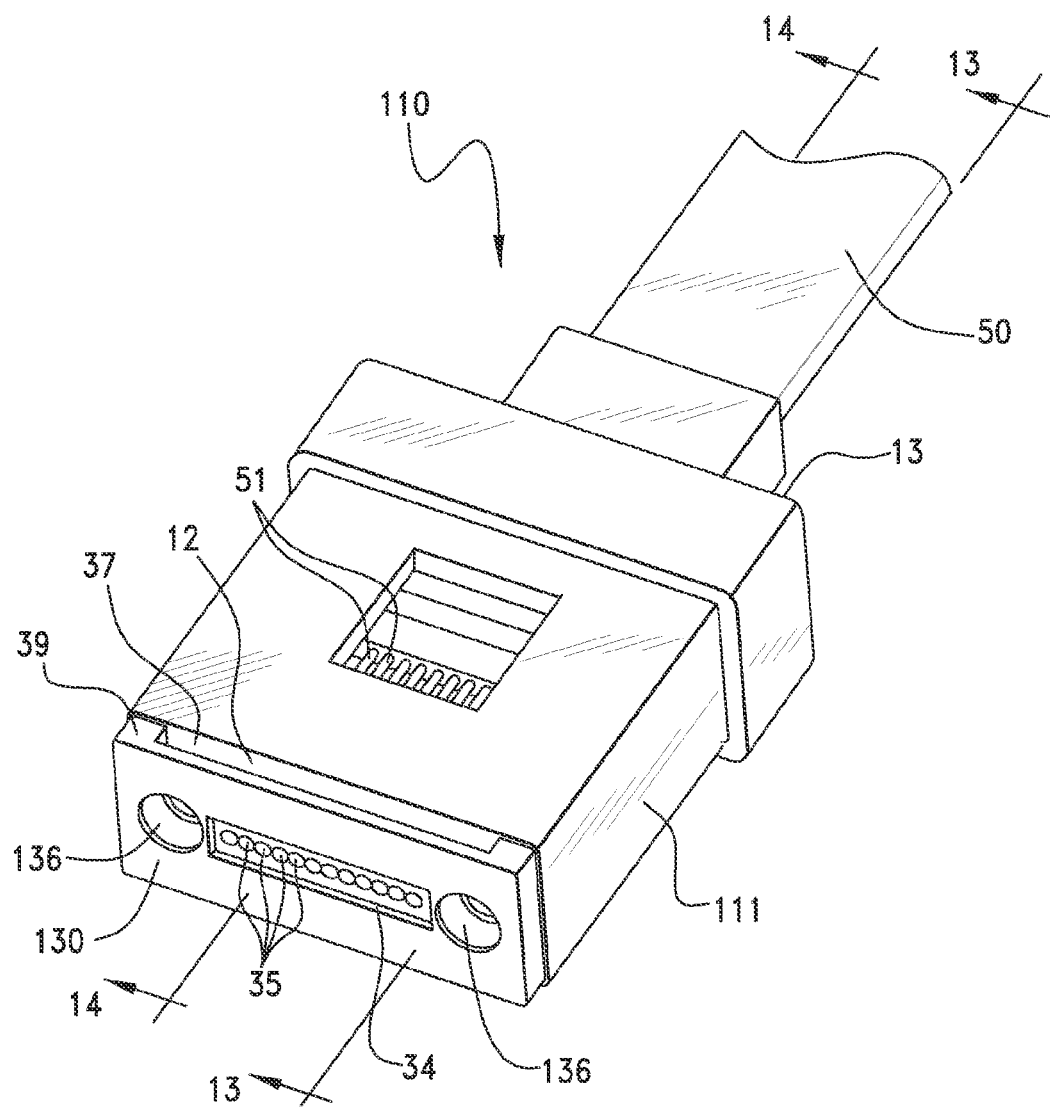
FIG. 8 is a perspective view of an alternate embodiment of a terminated ferrule and lens plate assembly.

Referring to FIGS. 3-4, it can be seen that lens plate 30 includes an index-matched medium receiving reservoir 37 that has a sloped surface 38 which extends from upper surface 39 of lens plate 30 to the flat rear face 33. As a result, as best seen in FIGS. 6-7, reservoir 37 has a greater width (along the mating direction of the assembly 10) adjacent upper surface 39 with the reservoir tapering to a relatively narrow width adjacent gap 41. Lens plate 30 also has a pair of circular spacers or pedestals 40 projecting from rear face 33 with one surrounding each guide hole 36. The length of the spacers is chosen to define a consistent distance or gap 41 (FIGS. 6-7) between the front face 12 of ferrule body 11 and the rear face 33 of lens plate 30. A consistent gap is desirable to maximize consistency of light transmission as well as adhesion between ferrule body 11 and lens plate 30 if the medium 42 between the ferrule body and the lens plate is an adhesive.

More specifically, during the manufacturing process, gap 41 may be filled with a medium 42 that closely matches the refractive index of the lens plate 30 and optical fibers 51. The medium 42 may be an index-matched adhesive such as an epoxy that will not only transfer light between the optical fibers 51 and the lens plate 30 in an efficient manner but also functions to secure the lens plate to the ferrule body 11. If the lens plate is secured to the ferrule body 11 using some structure or mechanism other than adhesive, the medium could be an index-matching gel, fluid or other material that does not have adhesive qualities. Regardless of the medium, the spacers 40 function to provide a consistent gap or space 41 between the front face 13 of ferrule body 11 and the rear face 33 of lens plate 30. By maintaining a consistent gap across the optical fiber and lens plate interface, the same thickness of the index-matching medium extends between the end faces of each optical fiber 51 and its respective aligned optical element 35 of the lens plate 30. As a result, consistency of the light passing from ferrule body 11 through lens plate 30 is improved from fiber-to-fiber within the assembly and when comparing multiple assemblies. This improved consistency is desirable for improved system performance.

In addition, many common UV-cured epoxies have optimum adhesion performance with a thickness of between approximately 25-50 microns. In the depicted embodiment, an index-matched UV-cured epoxy adhesive 42 is used and thus the gap 41 could be dimensioned at approximately 25-50 microns. As depicted, spacers 40 have a length of approximately 36 microns and extend from flat rear face 33 of lens plate 30 in the direction of mating the ferrule assembly 10. Gaps of other dimensions may be used depending on the performance characteristics of the index-matching medium between the front face 12 of ferrule body 11 and rear face 33 of lens plate 30. When changing the length or width of the gaps, it may be desirable or necessary to adjust the geometry and dimensions of the lens plate 30 and its optical elements 35 in order to account for changes in the overall optical transmission system such as the optical characteristics of the medium, the material of the lens plate and the distance between the lens plate and the optical fibers.

Index-matched medium receiving reservoir 37 is provided in upper surface 39 of lens plate 30 in order to improve the application of the medium 42 which fills the gap 41 between ferrule body 11 and lens plate 30. It has been found that applying an index-matched medium directly to at least one of the ferrule body 11 and lens plate 30 may result in air bubbles being formed between the end faces of the optical fibers 51 and their respective optical elements 35, which can cause diffraction of the light resulting in poor light transmission and signal loss. By applying the index-matched medium 42 to the reservoir 37 and relying upon capillary action and gravity to cause the medium to travel into the gap 41 between the ferrule body 11 and lens plate 30, the number of air bubbles is substantially reduced.

Referring to FIGS. 2-3 and 5, a process in which the lens plate 30 is mounted on ferrule body 11 is shown. FIG. 2 depicts the ferrule body 11 terminated to the plurality of optical fibers 51 within multi-fiber cable 50 and with the front face 12 of ferrule body 11 and the end faces of the optical fibers 51 polished as desired. Lens plate 30 is spaced from ferrule body 11 with the guide holes 36 in lens plate 30 aligned with the alignment holes 16 in the front face 12 of ferrule body 11. An assembly fixture 53 is somewhat schematically depicted and may be used for aligning the ferrule body 11 and lens plate 30. More specifically, fixture 53 includes an opening 54 into which a rear portion of the ferrule body 11 and multi-fiber cable 50 extend and a pair of spaced apart alignment posts 55 that pass through the guide holes 16 of ferrule body 11 and guide holes 36 of lens plate 30 to align the ferrule body with the lens plate during the manufacturing process.

Referring to FIG. 3, multi-fiber cable 50 is threaded through opening 54 in the fixture 53 and the ferrule body 11 terminated thereto is moved towards fixture 53 such that guide posts 55 slide through alignment holes 16 of ferrule body 11 with the end portions of the guide posts extending from the front face 12 of ferrule body 11. Lens plate 30 is depicted as being spaced from ferrule body 11 and positioned such that guide holes 36 are aligned with the guide posts 55 of fixture 53.

In FIG. 5, the lens plate 30 has been slid onto the guide posts 55 of fixture 53 with the ends of the guide posts extending from the guide holes 36 past the front face 32 of lens plate 30. The end surfaces 43 of spacers 40 are pressed against the front face 12 of ferrule body 11 in order to create the gap 41. An additional portion of the fixture (not shown) is utilized to temporarily secure the lens plate 30 in position against ferrule body 11. An index-matched adhesive such as epoxy may be deposited in index-matched medium receiving reservoir 37 at the upper surface 39 of lens plate 30 such as by a syringe 56 until the reservoir is sufficiently filled. The small size of the gap 41 between the front face 12 of ferrule body 11 and rear face 33 of lens plate 30 and the viscosity of the adhesive will cause the adhesive to be drawn into and fill gap 41 due to capillary action as well as gravity. Reservoir 37 may be sized so that enough adhesive will fit in the reservoir to fill gap 41 as desired. It may be possible to extend gap 41 closer to or adjacent upper surface 30 of lens plate 30 and utilize an external, removable fixture that acts as a reservoir adjacent the gap 41. After the adhesive travels from the reservoir to the gap 41, the adhesive may be cured such as with UV energy before the ferrule and lens assembly 10 is removed from fixture 53. Other manners of curing the adhesive could be used, depending on the type of adhesive, and some mediums may not need any type of curing or subsequent processing.

It should be noted that lens plate 30 may be formed of a material that is softer or more compressible than the ferrule body 11. As a result, pressing the end surfaces 43 of spacers 40 against the front face 12 of ferrule body 11 also causes a small amount of deformation of the spacers and creates a seal between the end surfaces of the spacers and the front face of the ferrule body. Such a seal will prevent or reduce the likelihood that the index-matched medium 42 will migrate or flow past the seal and into the alignment holes 16 in ferrule body 11 or the guide holes 36 in lens plate 30 and thus impair the alignment or mating of a pair of ferrule assemblies 10.

Referring to FIG. 6, it can be seen that an index-matched adhesive 42 is located between and secures front face 12 of ferrule body 11 to rear face 33 of lens plate 30 around spacer 40. Adhesive 42 is prevented from entering the alignment holes 16 in ferrule body 11 and guide holes 36 in lens plate 30 by the sealing interaction of the end surface 43 of spacer 40 with the front face 12 of ferrule body 11. Gap 41 between the front face 12 of ferrule body 11 and rear face 33 of lens plate 30 along the array of fiber receiving holes 15 may be uniformly filled with adhesive 42 as best seen in FIG. 7. Accordingly, each of the optical fibers 51 will desirably have a uniform, air bubble-free medium transmission system extending between the optical fibers and their respective lens elements. In addition, the thickness of the adhesive can be accurately controlled to maximize adhesion.

Referring to FIGS. 8-14, an alternate embodiment of a multi-fiber lensed MT type ferrule assembly 110 is illustrated. Like components are identified by like reference numbers and the description thereof is not repeated herein. The ferrule assembly 110 includes a ferrule body 111 having a light expanding element such as lens plate 130 and terminated to a multi-fiber cable 50 having a plurality of optical fibers 51. As depicted, ferrule assembly 110 includes one row of twelve optical fibers 51 although the ferrule assembly could be configured to receive greater or fewer optical fibers if desired. Ferrule body 111 may be identical to that of the embodiment illustrated in FIGS. 1-7 but includes only one row of generally cylindrical optical fiber receiving holes 15.

Lens plate 130 is similar to the lens plate 30 illustrated in FIGS. 1-7. However, lens plate 130 only has a single row of lens elements 35 within recess 34 so as to correspond to the single row of optical fiber receiving holes 15 within ferrule body 111. Lens plate 130 includes a pair of cylindrical guide holes or receptacles 136 that are configured to be aligned with the alignment holes 16 of ferrule body 111. As best seen in FIG. 13, each guide hole 136 is configured to have a diameter 137 that is larger than the diameter 17 of alignment holes 16 of ferrule body 111. In one embodiment, the guide holes 136 may have a diameter of approximately eight hundred microns while the alignment holes 16 of ferrule body 111 have a diameter of approximately seven hundred microns. As such, the ratio between the alignment holes 16 and the guide holes 136 is approximately 0.875. In another embodiment, the guide holes 136 may have a diameter of between approximately seven hundred and fifty microns and one thousand microns while the alignment holes 16 of ferrule body 111 have a diameter of approximately seven hundred microns. In such example, the ratio between the alignment holes 16 and the guide holes 136 may be within a range of approximately 0.7 to 0.933.

Figure 9:
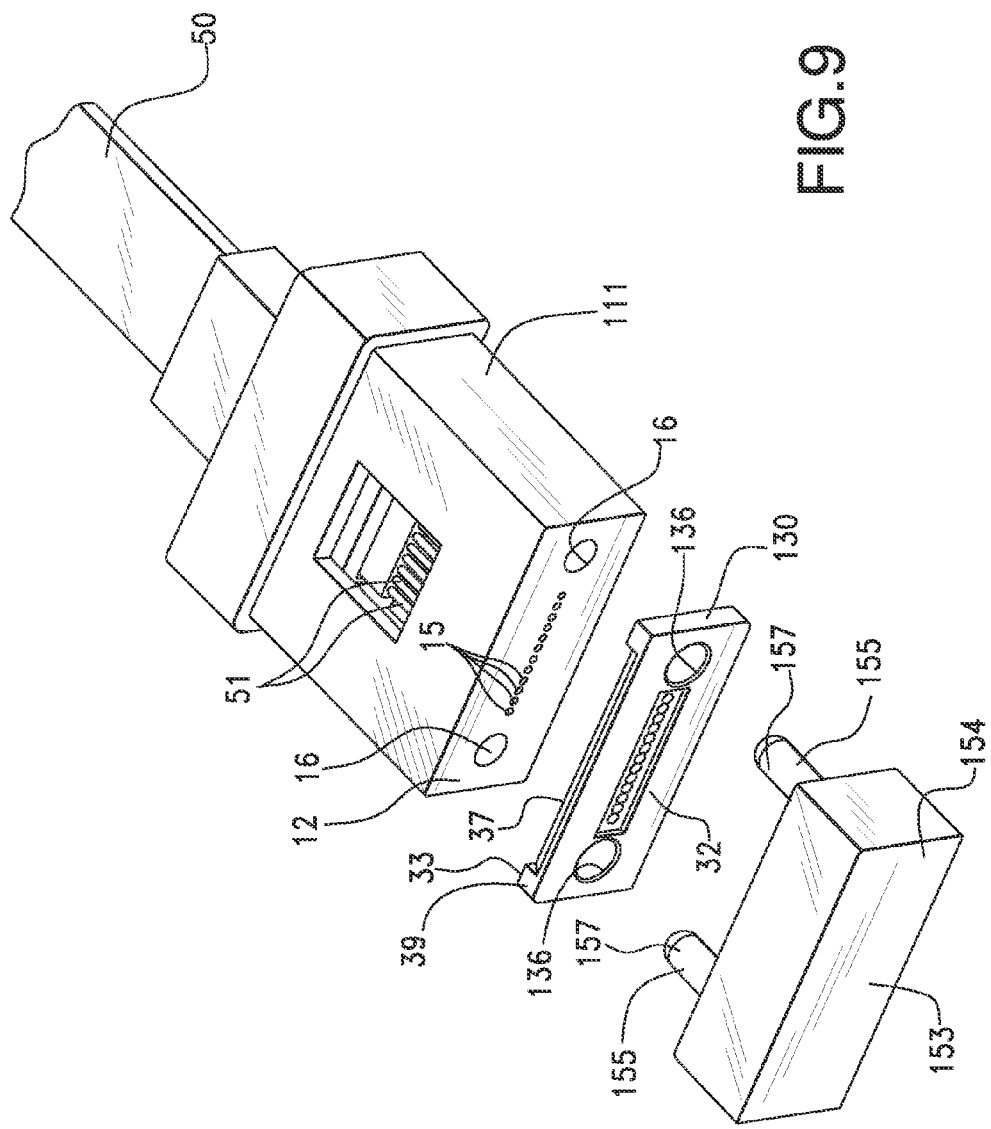
FIG. 9 is a perspective view of the terminated ferrule body and lens plate of FIG. 8, prior to positioning on the ferrule together with an assembly fixture.
Figure 12:
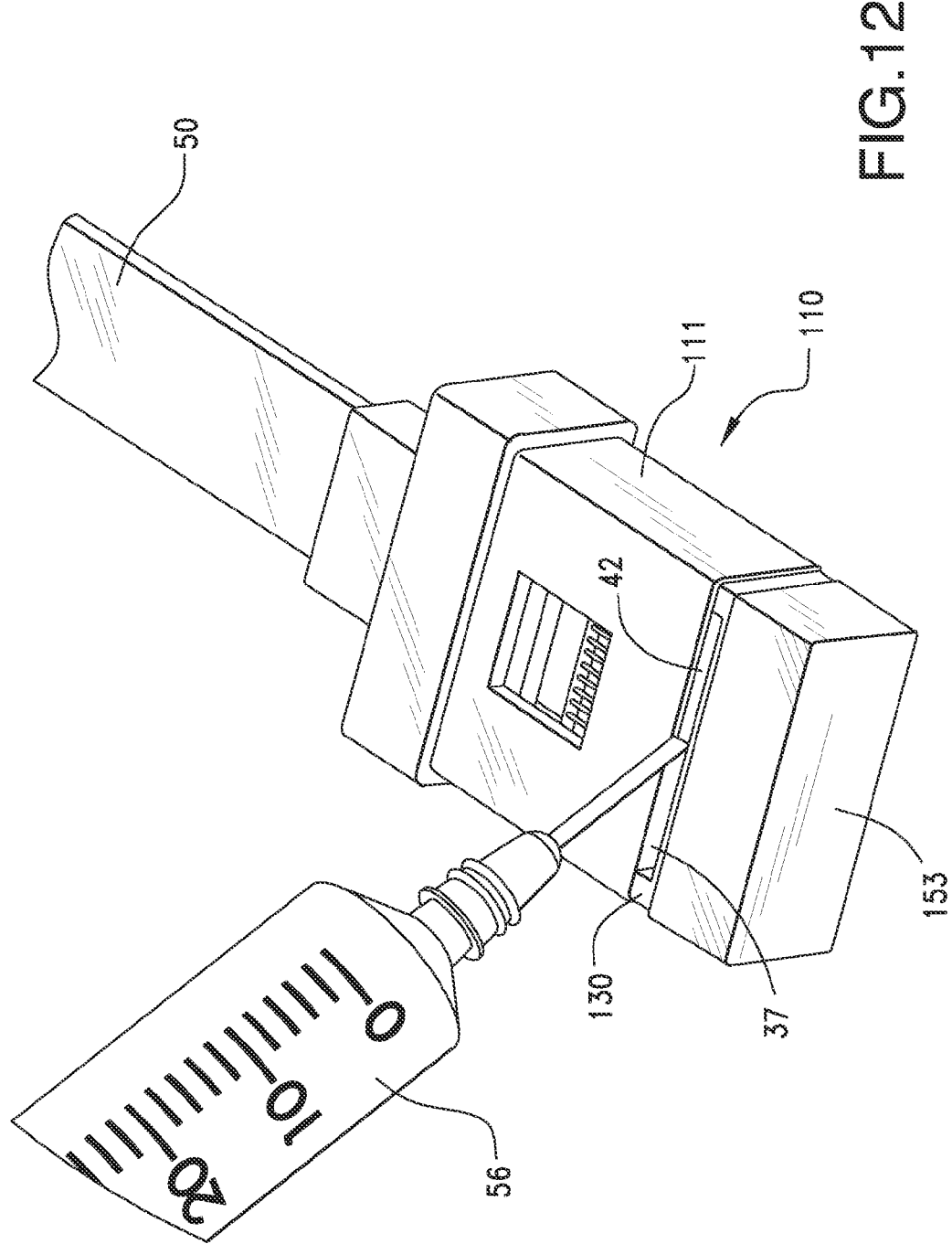
FIG. 12 is a perspective view similar to FIG. 9, but with the ferrule body assembly and lens plate mounted on the assembly fixture and during the process of applying an adhesive.

Referring to FIGS. 9-10 and 12, a process in which the lens plate 130 is mounted on ferrule body 111 is shown. FIGS. 9-10 depict the ferrule body 111 terminated to the plurality of optical fibers 51 within multi-fiber cable 50 and with the front face 12 of ferrule body 111 and the end faces of the optical fibers 51 polished as desired. Lens plate 130 is spaced from ferrule body 111 with the guide holes 136 in lens plate 130 aligned with the alignment holes 16 in the front face 12 of ferrule body 111.

An assembly fixture 153 may be used for aligning the ferrule body 111 and lens plate 130. More specifically, fixture 153 has a generally rectangular body 154 and a pair of spaced apart guide posts 155 that pass through the guide holes 136 of lens plate 130 and into alignment holes 16 of ferrule body 111 to align the ferrule body 111 with the lens plate 130 during the manufacturing process. Each guide post 155 may include an enlarged first section 156 adjacent body 154 that has a diameter generally configured to match the diameter of 137 of guide hole 136 in lens plate 130. Each guide post may further include a second section 157 spaced from body 154 that has a diameter generally configured to match the diameter of 17 of the alignment holes 16 in ferrule body 111 and smaller than the diameter of the first section 156. If desired, the enlarged first section 156 of the guide posts 155 may be formed as part of the body 154.

In FIG. 12, the lens plate 130 has been slid onto the guide posts 155 of fixture 153 with the ends of the guide posts extending through the guide holes 136 past the rear face 33 of lens plate 130 and into the alignment holes 16 in the front face 12 of ferrule body 111. During assembly, lens plate 130 may be slid onto assembly fixture 153 with the enlarged first section 156 of each guide post 155 positioned within one of the guide holes 136. The assembly fixture 153 having the lens plate 130 thereon may then be moved relatively towards ferrule body 111 with the second section 157 of each guide post 155 sliding into one of the alignment holes 16 in ferrule body 111. With this configuration, the end surfaces 43 of spacers 40 are pressed against the front face 12 of ferrule body 111 in order to create a gap 41. An index-matched medium 42 such as epoxy may be deposited in reservoir 37 at the upper surface 39 of lens plate 130 such as by a syringe 56 until the reservoir is sufficiently filled as described above with respect to the embodiment illustrated in FIGS. 1-7.

Referring to FIG. 13, it can be seen that an index-matched adhesive 42 is located between and secures front face 12 of ferrule body 111 to rear face 33 of lens plate 130 around spacer 40. Adhesive 42 is prevented from entering the alignment holes 16 in ferrule body 111 and guide holes 136 in lens plate 130 by the sealing interaction of the end surface 43 of spacer 40 with the front face 12 of ferrule body 111. Each guide hole 136 is configured to have a diameter 137 that is larger than the diameter 17 of its aligned alignment hole 16. Gap 41 between the front face 12 of ferrule body 111 and rear face 33 of lens plate 130 along the array of fiber receiving holes 15 may be uniformly filled with adhesive 42. Each of the optical fibers 51 will desirably have a uniform, air bubble-free medium transmission system extending between the optical fibers and their respective lens elements. In addition, the thickness of the adhesive can be accurately controlled to maximize adhesion.

While a preferred embodiment of the Present Disclosure is shown and described, it is envisioned that those skilled in the art may devise various modifications without departing from the spirit and scope of the foregoing Description and the appended Claims.

What is claimed is:
1. An optical fiber assembly comprising:
a ferrule body having a plurality of optical fiber receiving receptacles, each optical fiber receiving receptacle having an optical fiber terminated thereto, the ferrule body having a front face, an end of each optical fiber being positioned adjacent the front face of the ferrule body;

a beam-expanding element adjacent the front face of the ferrule body including a lens array aligned with the optical fibers of ferrule, the lens array being spaced from the optical fibers by a predetermined distance to form a gap, and an index-matched medium receiving reservoir adjacent the gap; and an index-matched medium within the gap to secure the beam-expanding element to the ferrule body, wherein the front face of the ferrule body is generally planar, the beam-expanding element includes a generally planar rear face and the rear face further includes a spacer engaging the front face of the ferrule body to define the width of the gap, wherein the spacer is integral with the beam-expanding element, and wherein the spacer is compressible to create a seal between the spacer and the front face of the ferrule body.

2. The optical fiber assembly of claim 1, wherein the index-matched medium is an adhesive and, at least in part, secures the beam-expanding element to the ferrule body.

3. The optical fiber assembly of claim 1, wherein the gap is between approximately 25 and 50 microns wide.

4. The optical fiber assembly of claim 1, wherein the beam-expanding element is a generally rectangular lens plate having a generally planar rear face and a plurality of lenses, each lens being aligned with one of the optical fibers, and the ferrule body has a generally planar front face, the generally planar front face being positioned adjacent the generally planar rear face of the lens plate.

5. The optical fiber assembly of claim 1, wherein the optical fibers are arranged in at least one generally linear array and the reservoir extends linearly generally parallel to and is at least as long as the linear array of optical fibers.

6. An optical fiber assembly comprising:
a ferrule body having a plurality of optical fiber receiving receptacles, each optical fiber receiving receptacle having an optical fiber terminated thereto, the ferrule body having a front face, an end of each optical fiber being positioned adjacent the front face of the ferrule body, the front face having a pair of alignment holes configured to receive a post therein;

a beam-expanding element adjacent the front face of the ferrule body including a lens portion aligned with the optical fibers of ferrule body, the lens portion having a pair of guide holes aligned with the alignment holes of the ferrule body, the guide holes having a constant diameter that is larger than a diameter of the alignment holes; and an index-matched medium between the lens portion and the ends of the optical fibers.

7. A method of manufacturing an optical fiber cable assembly, comprising the steps of:
providing a ferrule body with a front face and a plurality of optical fiber receiving receptacles, each optical fiber receiving receptacle having an optical fiber terminated thereto with an end of each optical fiber positioned adjacent the front face;

positioning a beam-expanding element adjacent the front face with lens portions of the beam-expanding element in alignment with optical fibers of ferrule body, the lens portions being spaced from the optical fibers by a predetermined distance to form a gap; and applying an index-matched medium to a reservoir adjacent the gap with at least some of the medium moving from the reservoir into the gap.

8. The method of claim 7, wherein the medium is an adhesive and further including the step of curing the adhesive to secure the beam-expanding element to the ferrule.

9. An optical fiber assembly comprising:
a ferrule body having a plurality of optical fiber receiving receptacles, each optical fiber receiving receptacle having an optical fiber terminated thereto, the ferrule body having a generally planar front face, an end of each optical fiber being positioned adjacent the front face of the ferrule body;

a beam-expanding element having a generally planar rear face adjacent the front face of the ferrule body, and further including a lens portion aligned with the optical fibers of ferrule body;

a spacer engaging the front face of the ferrule body to at least in part define a gap between the rear face of the beam expanding element and the front face of the ferrule body; and an index-matched medium within the gap and between the lens portion and the ends of the optical fibers, wherein the spacer is integrally formed with the beam-expanding element, wherein the spacer is integral with and extends from the rear face of the lens portion, and wherein the spacer is compressible to create a seal between the spacer and the front face of the ferrule body.

10. The optical fiber assembly of claim 9, wherein the ferrule body includes first and second spaced apart alignment holes and the beam-expanding element includes first and second spaced apart guide holes, the first alignment hole of the ferrule being coaxial with the first guide hole of the beam-expanding element and the second alignment hole of the ferrule being coaxial with the second guide hole of the beam-expanding element.

11. The optical fiber assembly of claim 10, where in the first and second guide holes have a larger diameter than the first and second alignment holes.

12. The optical fiber assembly of claim 10, further including first and second spacers for maintaining a rear face of the beam-expanding element a predetermined distance from the optical fibers, each first spacer being coaxial with the first alignment hole and the first guide hole and each second spacer being coaxial with the second alignment hole and the second guide hole.

13. The optical fiber assembly of claim 12, wherein each spacer has a length in a direction of mating of the optical fiber assembly of between approximately 25 and 50 microns.

14. The optical fiber assembly of claim 9, wherein the spacer has a length in a direction of mating of the optical fiber assembly of between approximately 25 and 50 microns.

* * * * *